US012045814B2

(12) United States Patent
Sabandith

(10) Patent No.: US 12,045,814 B2
(45) Date of Patent: Jul. 23, 2024

(54) SYSTEM AND METHOD FOR TRACKING AND CONTROLLING PRINT CARTRIDGE OWNERSHIP TRANSFERS USING NON-FUNGIBLE TOKENS

(71) Applicant: Toshiba TEC Kabushiki Kaisha, Shinagawa-ku (JP)

(72) Inventor: Milong Sabandith, Irvine, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 17/942,726

(22) Filed: Sep. 12, 2022

(65) Prior Publication Data
US 2024/0086910 A1  Mar. 14, 2024

(51) Int. Cl.
G06Q 20/38 (2012.01)
B41J 2/175 (2006.01)
G06Q 20/12 (2012.01)

(52) U.S. Cl.
CPC ........ G06Q 20/389 (2013.01); B41J 2/17546 (2013.01); G06Q 20/1235 (2013.01)

(58) Field of Classification Search
None
See application file for complete search history.

(56) References Cited

U.S. PATENT DOCUMENTS 10,607,046 B2 * 3/2020 Rice .................. G06K 19/0723
10,928,803 B2 * 2/2021 Biernat ..................... H04L 9/50
2004/0181681 A1 * 9/2004 Salisbury ................ G06F 21/84
    713/170
2022/0088882 A1 * 3/2022 Darcy ..................... H04L 67/12
2022/0366061 A1 * 11/2022 Spivack ................ H04L 9/3271

FOREIGN PATENT DOCUMENTS

WO  WO-2013192618 A1 * 12/2013 .......... B41J 2/17559
WO  WO-2023278635 A1 *  1/2023

* cited by examiner

Primary Examiner — Paul S Schwarzenberg
(74) Attorney, Agent, or Firm — UB Greensfelder LLP; John X. Garred

(57) ABSTRACT

A system and method of a system provides for tracking and controlling print cartridge ownership transfers using non-fungible tokens (NFTs). A print cartridge manufacture creates a unique NFT for each manufactured print cartridge that is stored on a public blockchain. Each NFT is encoded with a serial number of its associated cartridge, along with manufacturer information stored in the manufacturer's digital certificate. Each NFT may include manufacturer information, transactional information and a smart contract. Sale or resale of a cartridge is accomplished by a sale of its associated NFT on a digital marketplace. Sales are governed by smart contract terms. A buyer scans a cartridge QR code to decode its serial number which is then used to lookup manufacturer information, cartridge information and transactional information. If a purchase permitted and is accepted, the buyer information and sale information are updated to the blockchain with the associated NFT which is placed in the possession of the buyer.

20 Claims, 5 Drawing Sheets

SYSTEM AND METHOD FOR TRACKING AND CONTROLLING PRINT CARTRIDGE OWNERSHIP TRANSFERS USING NON-FUNGIBLE TOKENS

TECHNICAL FIELD OF THE INVENTION

This application relates generally to monitoring or controlling sale or resale of print cartridges, such as ink or toner cartridges. The application relates more particularly to use of non-fungible tokens, each uniquely tied to a print cartridge, and a blockchain ledger including a smart contract to accomplish such monitoring or controlling.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Printers, such as MFPs, use consumables such as toner, ink and paper for printing. As used herein, print cartridges are understood to mean toner cartridges, ink cartridges, or any cartridge housing a deposition component to place indicia on a tangible medium.

Manufactures typically require or recommend that only factory supplied print cartridges are to be used with their equipment. This allows for maintaining compatibility, print quality and device functionality. In certain situations, an MFP warranty may be compromised if an unauthorized print cartridge is used by a consumer. In other situations, a user may seek to have a cartridge refilled as a cost savings. This may or may not be authorized the MFP manufacturer.

Print cartridges are typically sold by a manufacturer to a distributer. The distributor, in turn may sell the cartridges to MFP device users. MFP device users may look to sell unneeded cartridges to third parties. There are also companies that acquire spent cartridges, refill them, and offer them for sale. A purchaser of cartridges from an open marketplace may not know if they're purchasing a new cartridge or one that has been refilled. They may also be unaware if a cartridge was refilled multiple times, or who refilled it. They may also be unaware if a refill is factory authorized, either as a single refill or a controlled number of refills. Thus, there is danger that a consumer may damage their equipment or compromise their warranty by use of an acquired cartridge.

BRIEF DESCRIPTION OF THE DRAWINGS

Various embodiments will become better understood with regard to the following description, appended claims and accompanying drawings wherein:

DETAILED DESCRIPTION OF THE INVENTION

Figure 1:
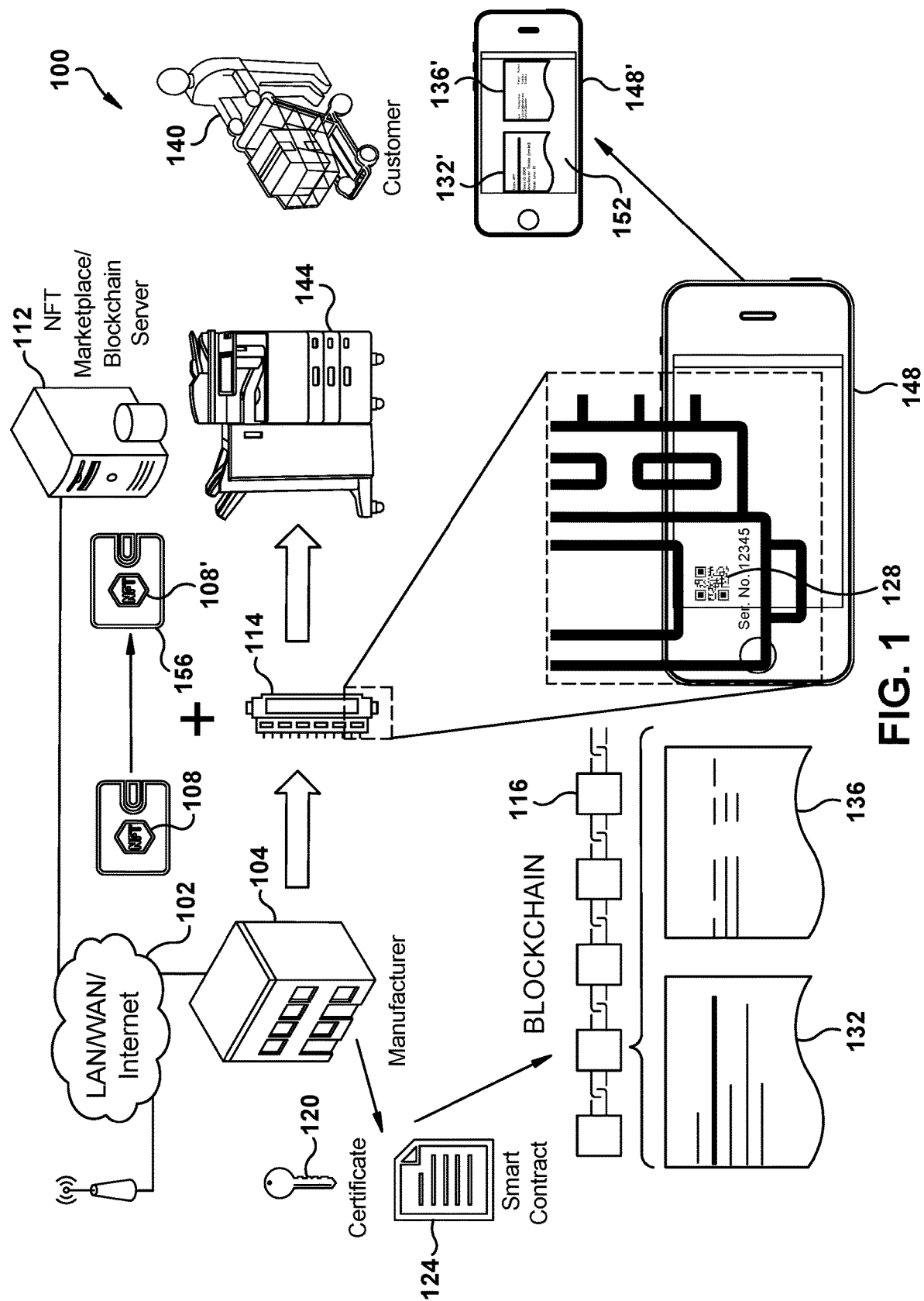
FIG. 1 an example embodiment of a system for tracking and controlling print cartridge ownership transfers using non-fungible tokens.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Example embodiments herein reference toner. It is to be understood that any print deposition component may be used, such as ink.

Suppling toner is very important for printer manufacturers. There may be a significant investment in intellectual property for advancement in toner composition or toner delivery, such as replaceable toner cartridges. Supplying of original equipment manufacturer (OEM) toner assure consumers of compatibility and quality, and may provide a mechanism to recoup such an investment. This may be particularly important when MFPs themselves are sold or leased at little or no profit.

As noted above, various problems can occur when non-OEM toner is used, such as damaging MFP hardware, particularly during prolonged use. There is a need for customers for a way to verify legitimacy of the toner cartridges they purchase. Depending on a manufacturer's specifications, OEM toner cartridges may be designated as single use, or subject to a controlled number of refills, which refills may be limited to the OEM itself, or its approved vendors.

Example embodiments herein use smart contracts in a blockchain ledger to set forth legitimate uses for a toner cartridge. Smart contracts can prohibit resale of refilled cartridges or limit a number of refills. Smart contracts can also secure a fee payment on any refill or resale, suitably providing to the OEM compensation for matters such as use of its intellectual property. The system employs non-fungible tokens (NFTs) to prove legitimacy of toner cartridges.

An NFT is a record on a blockchain that is associated with a particular digital or physical asset. NFT ownership is recorded in the blockchain, and can be transferred by the owner, allowing NFTs to be sold and traded. NFTs can be freely created and require few or no coding skills to create. NFTs typically contain references to digital files such as photos, videos, and audio. In this instance, a unique NFT is associated with each physical print cartridge. Insofar as NFTs are uniquely identifiable assets, they differ from cryptocurrencies, which are fungible.

In example embodiments herein, an NFT may be used to look up a manufacturer, as well as any transactions that occurred with the toner. Example transactions may include items such as transfer of ownership, name of manufacturer, name of seller, name of purchaser, price paid, transfer date, refill date, refill number, or any other transactional information of interest. Association of toner with an NFT ties a sale of a toner cartridge with its NFT. The NFT record is saved on the blockchain to prevent tampering and allow the public to verify the manufacturer and transaction history. An NFT sale is, by proxy, a sale of its associated toner cartridge. Sales are suitably conducted on a marketplace which allows smart contracting to be done. An NFT marketplace is a digital platform for buying and selling NFTs. These platforms allow for storage and display NFTs, as well as sell them, suitably for cryptocurrency or money.

Example embodiments herein leverage a QR code on a print cartridge to allow a user to scan it using a device, such as a tablet or smartphone, to lookup cartridge history. In a first step, a print cartridge is digitized with a unique identifier. This suitably uses a unique cartridge serial number which is supplied by the manufacturer and serves to control and ensure uniqueness. The serial number is suitably encoded in cartridge indicia, such as encoded as a QR code or a barcode which provides for a user friendly interface. An NFT is created using the serial number and the manufacturer's certificate. Such certificates, when issued, comprise data that is digitized with a digital identity is assigned to each certificate. Certificates are tagged and traceable. The original is safely stored in the blockchain. An NFT is minted, suitably by storing the token on a public blockchain like Ethereum or a blockchain maintained by the cartridge manufacturer. Use of a blockchain ensures that the information on the unique cartridge and manufacturer is stored in a public ledger that cannot be modified.

A cartridge purchase is consummated with a sale of its associated NFT on the on a NFT marketplace. The marketplace ensures the NFT is unique and certifies manufacturer origins. A buyer may view an NFT's history. Initially, this will be created by the manufacturer. When a sale is completed, a new entry is added to the blockchain recording the transfer of the token from the manufacturer to the customer.

A digital device, such as a smartphone, may then be used to verify cartridge history. Encoded indicia, such as a QR code, is scanned to gather the serial number serving as a unique cartridge identifier. The smartphone is configured to then query the blockchain to verify origins and history of the toner cartridge. This allows a customer to make an informed decision before purchasing a cartridge by looking up the history of the toner using this convenient application.

The cartridge NFT marketplace further utilizes smart contracts associated with NFTs. Terms of the resale may be recorded as a contract during NFT minting. This is recorded in the blockchain. By way of particular example, a resale percentage, such as 10 percent can be minted into a smart contract. If a customer tries to sell the NFT again on the marketplace, a 10 percent fee will be assessed and relayed to the manufacturer. A manufacturer can also indicate that no resale is allowed via the smart contract. In such an instance, the marketplace will block subsequent sales.

The NFT suitably functions to prevent product counterfeiting. Smart contracts may prevent resale or secure revenue for future sales. Stolen merchandize may be marked on the ledger to prevent future sales. NFTs offer customers confidence in the true origins of the toner. Use of a public blockchain ledger allows historic toner ownership to be tracked and verified by anyone of interest.

FIG. 1 illustrates an example embodiment of a system 100 for tracking and controlling print cartridge ownership transfers using NFTs. Included is network cloud 102, suitably comprised of a local area network (LAN), a wide area network (WAN), which may comprise the Internet, or any suitable combination thereof. Network cloud 102 is comprised of any suitable wireless or wired data connection or combination thereof, and functions for digital data communication between the illustrated devices.

Manufacturer 104 mints NFT 108 suitably using NFT marketplace/blockchain server 112. NFT 108 is recorded in blockchain 116, along with manufacturer certificate 120 and smart contract 124. NFT 108 is associated with a unique identifier on cartridge 114, such as QR code 128 in which the cartridge serial number is encoded. Blockchain information for NFT 108, and thus cartridge 114, may include cartridge information 132, such as a toner identifier, manufacturer name, and a resale levy fee. Blockchain information may also include transactional information 136, such as parties involved or date of transfer.

When a potential purchaser is found, such as customer 140 who is considering buying cartridge 114 for MFP 144, the purchaser uses their smartphone 148 to scan QR code 128. The QR code is decoded and its serial number information is used to query blockchain 116 on server 112. This returns a showing of cartridge information 132' and transactional information 136' on smartphone touchscreen 152. If customer 140 is satisfied with the cartridge information, they complete a purchase of cartridge 114 by purchasing NFT 108, which is transferred to their digital wallet 156 as NFT 108'. Transactional information 136 is then updated in accordance with the completed transaction.

Figure 2:
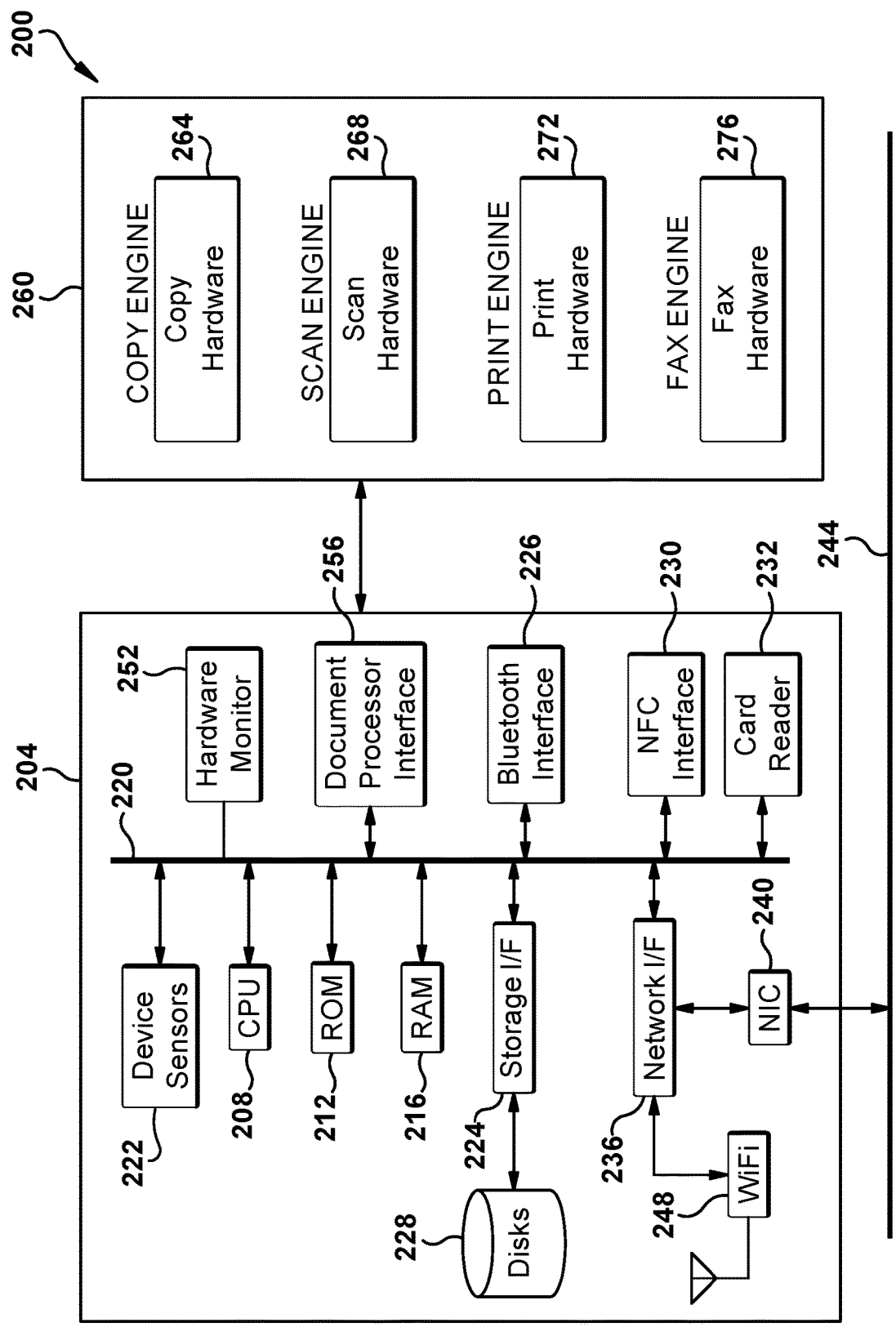
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 144 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with additional interfaces, such as Bluetooth interface 226, NFC interface 230 and card reader 232 for data exchange with proximity cards, such as card keys.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless network interfaces include optical, cellular, Wi-Fi, wireless universal serial bus (wireless USB), satellite, and the like. Example wired interfaces include Ethernet, USB, IEEE 1394 (FireWire), Lightning, telephone line, or the like.

Processor 208 can also be in data communication with any suitable user input/output (I/O) network interface 222 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a copy engine comprising copy hardware 264, a scan engine comprise of scan hardware 268, a print engine comprised of print hardware 272 and a fax engine comprised of fax hardware 276 which together comprise document rendering system 260. It will be understood that functional units are suitably comprised of intelligent units, including any suitable hardware or software platform.

Figure 3:
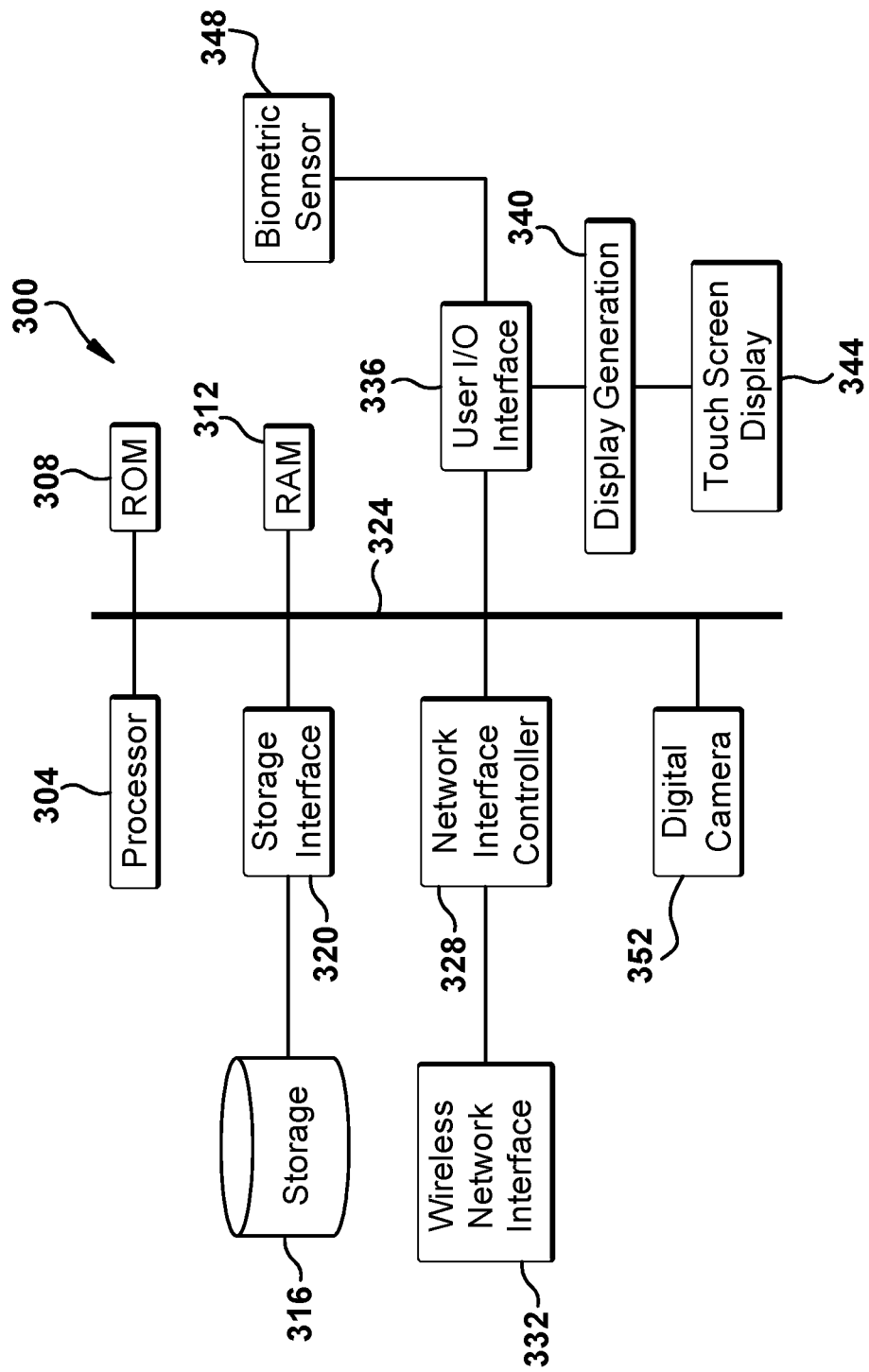
FIG. 3 is an example embodiment of a digital device system.

Turning now to FIG. 3, illustrated is an example embodiment of a digital data processing device 300 such as server 112 or smartphone 148 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used. User input/output interface 336 also provides connection to biometric sensor 348, suitably comprised of a fingerprint sensor, retinal sensor, or the like, and may be used to secure device access to one or more users. Processor 304 processor is also in data communication with a digital camera 352, suitably used to capture images which may include encoded images such as barcodes or QR codes. Digital camera 352 is also suitably used for facial recognition, including facial recognition for securing device access.

Figure 4:
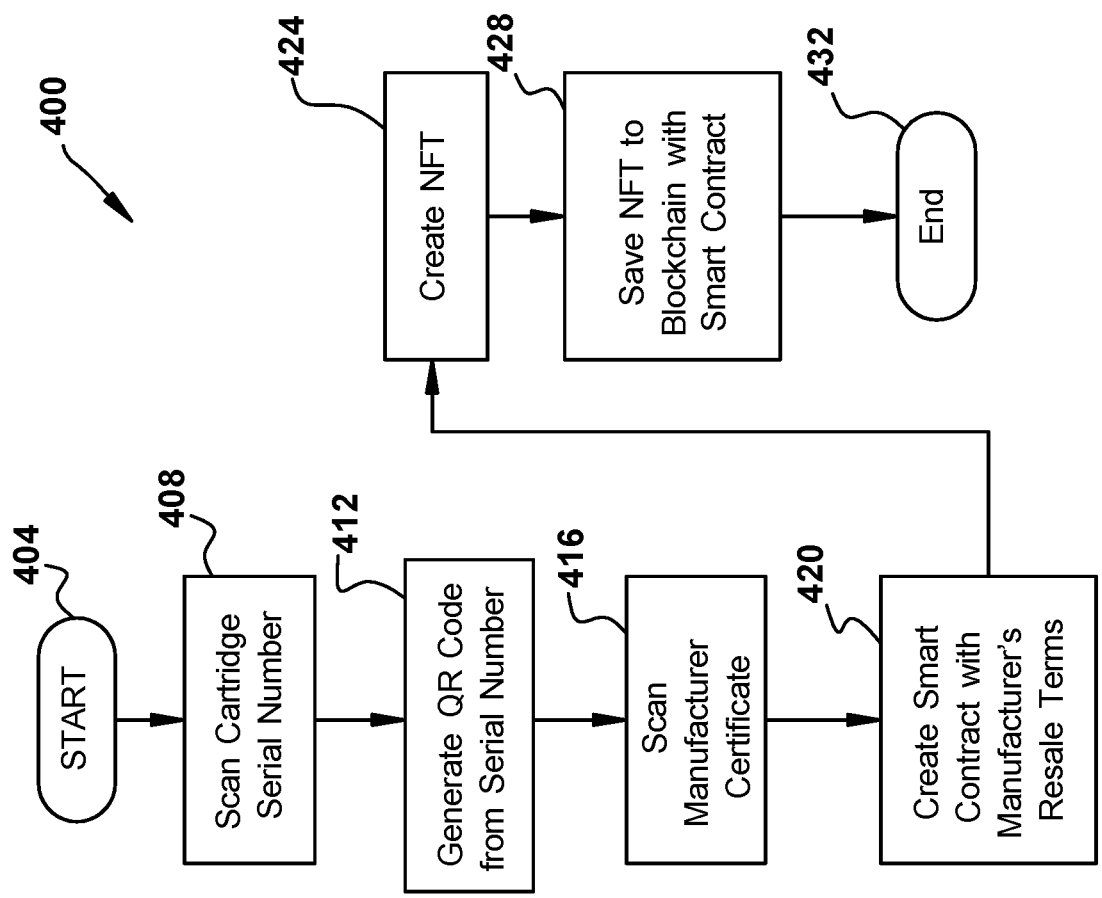
FIG. 4 is an example embodiment of a system for minting and storing a non-fungible token uniquely associated with a print cartridge.

FIG. 4 is a flowchart 400 illustrating an example embodiment of a system for minting and storing an NFT uniquely associated with a print cartridge. The process commences at block 404 and proceeds to block 408 where a cartridge serial number is encoded to generate a QR code at block 412. The cartridge manufacturer's certificate is scanned at block 416. The manufacturer creates a smart contract at block 420. Serial number information, certificate information and smart contract information is used to create an NFT at block 424 which is stored in the blockchain at block 428. The process ends at block 432.

Figure 5:
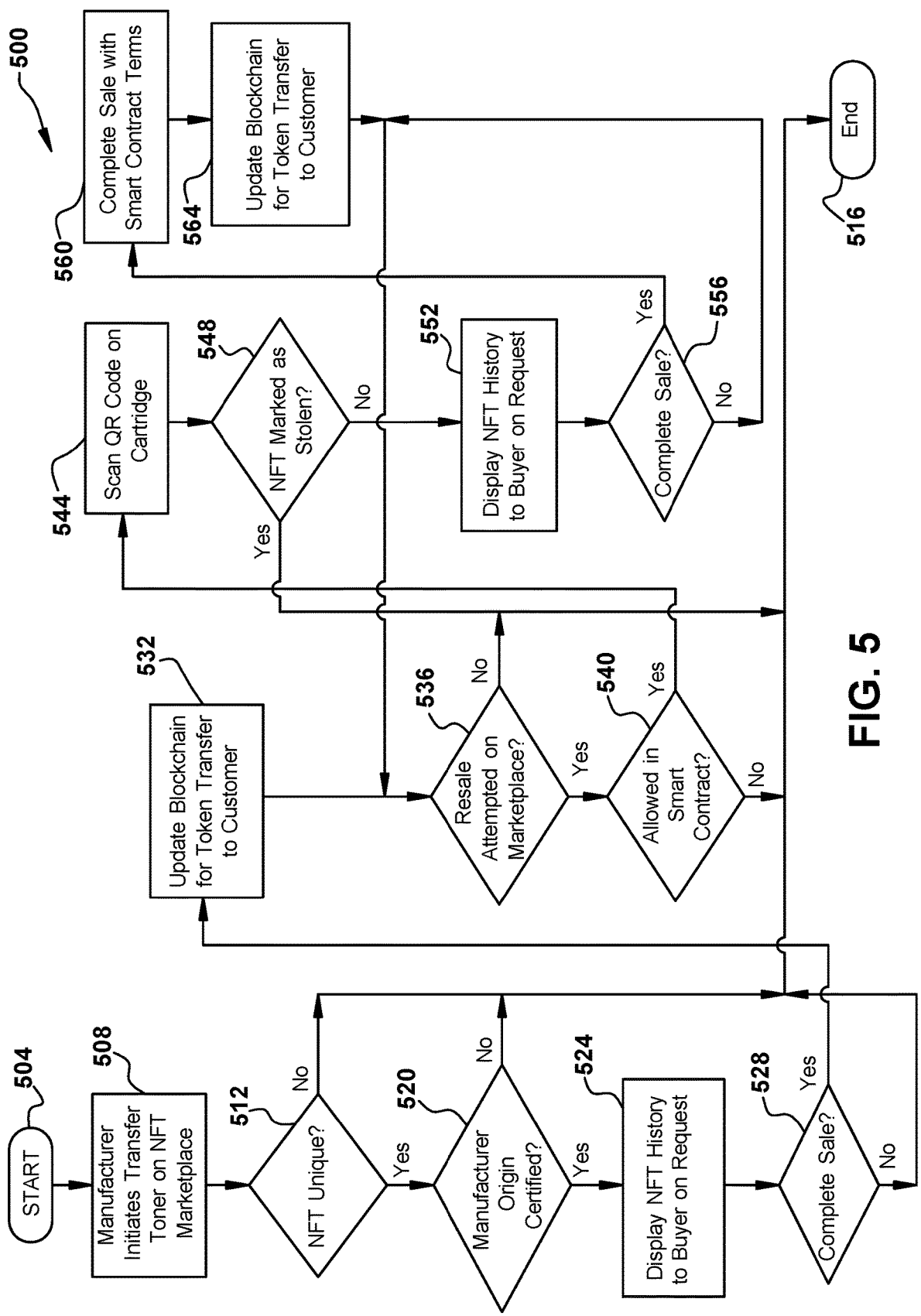
FIG. 5 is a flowchart of an example embodiment of a system for tracking and controlling print cartridge ownership transfers using non-fungible tokens.

FIG. 5 is a flowchart 500 of an example embodiment of a system for tracking and controlling print cartridge ownership transfers using NFTs. The process commences at block 504 and proceeds to block 508 where a manufacturer initiates a transfer of toner on an NFT marketplace. A check is made at block 512 to verify NFT whether the associated NFT is unique. If not, the process ends at block 516. If the NFT is unique, a check is made at block 520 to determine if the manufacturer's origin is certified. If it is not, the process ends at block 516. If it is unique, NFT information is displayed upon request at block 524. An informed buyer chooses at block 528 whether to complete the transaction. If they decline, the process ends at block 516. If they agree, the blockchain is updated at block 532.

A test is made at block 536 whether any subsequent sale of the cartridge is attempted. If not, the process ends at block 516. If a sale is attempted, a check is made at block 540 to determine it allowed in the associated smart contract. If no, the process ends at block 516. If yes, the cartridge QR code is scanned and decoded at block 544 and a check is made at block 548 of the NFT has been marked to indicate that cartridge has been stolen. If so, the sale cannot proceed and the process ends at block 516. If it is not marked as stolen, NFT information is displayed to the buyer on request at block 552. An informed buyer chooses at block 556 whether to complete the transaction. If they decline, the process ends at block 516. If they agree, the sale is completed under the smart contract terms at block 560. The blockchain is updated with the new transactional information at block 564 and the process returns to block 536 to determine whether another resale is attempted.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the spirit and scope of the invention.

What is claimed is:

1. A system comprising:
   one or more processors and associated memory;
   the one or more processors configured to generate a unique scannable indicia applied to each of a plurality of print cartridges, each unique scannable indicia encoding a corresponding unique print cartridge identifier;
   a digital camera configured to capture an image of a scannable indicia on a selected one print cartridge of the plurality of print cartridges;
   the one or more processors further configured to decode the scannable indicia on the selected print cartridge to obtain the unique print cartridge identifier associated with the selected print cartridge;
   the memory storing an electronic ledger comprising a blockchain;
   the blockchain including an NFT linked to the unique print cartridge identifier of the selected print cartridge;
   the blockchain including a smart contract corresponding to the NFT;
   the one or more processors configured to receive an ownership transfer request for the NFT via a data interface;
   the one or more processors further configured to selectively allow a transfer of ownership of the NFT responsive to the ownership transfer request in accordance with the smart contract; and
   the one or more processors further configured to receive, into the blockchain, transactional information in accordance with a successful transfer of the NFT ownership.

2. The system of claim 1 wherein the transactional information includes one or more of NFT seller information, NFT buyer information and NFT sale date.

3. The system of claim 2 wherein the one or more processors is further configure to:
   receive a status inquiry for the NFT via the data interface; and
   transmit the transactional information via the data interface responsive to a received status inquiry.

4. The system of claim 2 wherein the NFT seller information corresponds to a manufacturer of a print cartridge associated with the unique print cartridge identifier, and wherein the one or more processors is further configured to:
   receive a subsequent ownership transfer request for the NFT via the data interface;

selectively allow a transfer of ownership of the NFT responsive to the subsequent ownership transfer request in accordance with the smart contract; and receive, into the blockchain, transactional information for the subsequent ownership transfer in accordance with a successful transfer of NFT ownership.

5. The system of claim 4 wherein the one or more processors is further configured to selectively assess a transactional fee specified by the smart contract for each completed transfer of ownership of the NFT.

6. The system of claim 3 wherein the one or more processors or is further configured to receive the status inquiry including the unique print cartridge identifier decoded from indicia on the associated print cartridge.

7. The system of claim 6 wherein the indicia is comprised an encoded serial number of the associated print cartridge.

8. The system of claim 7 wherein the indicia is comprised of a barcode or a QR code.

9. A method comprising:
generating a unique scannable indicia applied to each of a plurality of print cartridges, each unique scannable indicia encoding a corresponding unique print cartridge identifier;

capturing, via a digital camera, an image of a scannable indicia on a selected one print cartridge of the plurality of print cartridges;

decoding, via one or more processors, the scannable indicia on the selected print cartridge to obtain the unique print cartridge identifier associated with the selected print cartridge;

storing an electronic ledger comprising a blockchain in a memory, the blockchain including an NFT linked to the unique print cartridge identifier of the selected print cartridge, the blockchain further including a smart contract corresponding to the NFT;

receiving an ownership transfer request for the NFT via a data interface;

selectively allowing a transfer of ownership of the NFT responsive to the ownership transfer request in accordance with the smart contract; and receiving, into the blockchain, transactional information in accordance with a successful transfer of NFT ownership.

10. The method of claim 9 wherein the transactional information includes one or more of NFT seller information, NFT buyer information and NFT sale date.

11. The method of claim 10 further comprising:
receiving a status inquiry for the NFT via the data interface; and transmitting the transactional information via the data interface responsive to a received status inquiry.

12. The method of claim 10 wherein the NFT seller information corresponds to a manufacturer of a print cartridge associated with the unique print cartridge identifier, and further comprising:
receiving a subsequent ownership transfer request for the NFT via the data interface;

selectively allowing a transfer of ownership of the NFT responsive to the subsequent ownership transfer request in accordance with the smart contract; and receiving, into the blockchain, transactional information for the subsequent ownership transfer in accordance with a successful transfer of NFT ownership.

13. The method of claim 12 further comprising selectively assessing a transactional fee specified by the smart contract for each completed transfer of ownership of the NFT.

14. The method of claim 11 further comprising receiving the status inquiry including the unique print cartridge identifier decoded from indicia on the associated print cartridge.

15. The method of claim 14 wherein the indicia is comprised an encoded serial number of the associated print cartridge.

16. The method of claim 15 further comprising decoding the indicia comprised of a barcode or a QR code.

17. A method comprising:
generating a unique scannable indicia applied to each of a plurality of print cartridges, each unique scannable indicia encoding a corresponding unique print cartridge identifier;

scanning, via a digital camera, indicia on a surface of a selected print cartridge;

decoding, via a processor, the scanned indicia to generate a unique identifier for the selected print cartridge;

sending a blockchain inquiry to an associated server in accordance with the unique identifier; and receiving a response to the blockchain inquiry from the associated server, the response including transactional information corresponding to ownership of an NFT assigned to the selected print cartridge.

18. The method of claim 17 further comprising:
sending a request for a transfer of ownership of the NFT to a server;

receiving a response to the request for transfer of ownership of the NFT from the server; and selectively transferring ownership of the NFT in accordance with the request for transfer of ownership of the NFT in accordance to the received response to the request to transfer ownership of the NFT.

19. The method of claim 18 further comprising receiving a fee assessment from the server when a transfer of the NFT is completed.

20. The method of claim 19 further comprising paying the fee assessment.

* * * * *